United States Patent
Thomson

(10) Patent No.: US 7,004,739 B2
(45) Date of Patent: Feb. 28, 2006

(54) APPARATUS FOR INJECTION MOLDING MULTILAYERED ARTICLES

(75) Inventor: Joel Thomson, Elka Park, NY (US)

(73) Assignee: Community Enterprises, LLC, Rifton, NY (US)

( * ) Notice: Subject to any disclaimer, the term of this patent is extended or adjusted under 35 U.S.C. 154(b) by 272 days.

(21) Appl. No.: 10/271,615

(22) Filed: Oct. 16, 2002

(65) Prior Publication Data

US 2003/0075833 A1    Apr. 24, 2003

Related U.S. Application Data

(60) Provisional application No. 60/330,397, filed on Oct. 18, 2001.

(51) Int. Cl.
*B29C 37/40* (2006.01)

(52) U.S. Cl. .............................. 425/131.1; 425/133.3; 425/204

(58) Field of Classification Search ............... 425/130, 425/131.1, 133.1, 204, 587; 366/178.1, 78
See application file for complete search history.

(56) References Cited

U.S. PATENT DOCUMENTS

| | | | |
|---|---|---|---|
| 3,956,438 A | 5/1976 | Schippers | 264/46.1 |
| 4,054,403 A | 10/1977 | Hornbeck et al. | 425/133.1 |
| 4,072,455 A | 2/1978 | Beck | 425/133.1 |
| 4,252,755 A | 2/1981 | Normanton et al. | 264/45.9 |
| 5,272,644 A * | 12/1993 | Katsumata et al. | 700/207 |
| 5,273,419 A * | 12/1993 | Mayer et al. | 425/204 |
| 5,490,725 A * | 2/1996 | Behrens et al. | 366/76.9 |
| 5,503,788 A | 4/1996 | Lazareck et al. | 264/115 |
| 5,863,567 A * | 1/1999 | Klaus | 425/145 |
| 6,033,205 A * | 3/2000 | Chiu | 425/562 |
| 6,287,491 B1 | 9/2001 | Kilim et al. | 264/40.1 |
| 6,474,972 B1 * | 11/2002 | Endo et al. | 425/148 |
| 6,627,134 B1 * | 9/2003 | Thomson | 264/255 |

FOREIGN PATENT DOCUMENTS

JP      976286     3/1997

OTHER PUBLICATIONS

English language abstract of Japanese Patent Publication No. JP 976286, Published Mar. 25, 1997, Derwent Information LTD 1999.

* cited by examiner

*Primary Examiner*—Duane Smith
*Assistant Examiner*—Emmanuel S. Luk
(74) *Attorney, Agent, or Firm*—Cooper & Dunham LLP

(57) ABSTRACT

An apparatus for injection molding two compatible polymeric materials, in which two or more plasticizing zones on a screw are used to simultaneously or sequentially plasticize the two materials into a common accumulation space through separate pathways. The charge comprising multiple layers of material is then injected into a closed mold by means of forward axial motion of the screw with respect to its enclosing barrel. Once inside the mold, the first material forms a skin layer, totally or partially surrounding the other material. In this way a part having a plurality of material properties may be produced in a single operation.

16 Claims, 7 Drawing Sheets

APPARATUS FOR INJECTION MOLDING MULTILAYERED ARTICLES

CROSS REFERENCE TO RELATED APPLICATIONS

This application claims the benefit of U.S. Provisional Application No. 60/330,397 filed Oct. 18, 2001.

BACKGROUND OF THE INVENTION

The most common commercial form of injection molding machine is known as a "reciprocating screw". In this type of machine, thermoplastic polymer is melted, mixed, and conveyed by means of a screw having one or more flights rotating within a heated pressure vessel. The screw is also permitted to translate axially to allow for the accumulation of melted material at the end of the screw. When sufficient melt has accumulated, the screw is stopped and translated forward to inject the melted material into a closed mold. In common practice a non-return valve is situated at the downstream end of the screw to prevent back flow into the screw flights during the injection portion of the cycle.

A variation of this process, known as co-injection or sandwich molding, has been commercially practiced for a number of years. As shown for example in FIG. 1, in its most common embodiment, co-injection is achieved by means of a molding machine fitted with two or more plasticizing units, each one containing a reciprocating screw enclosed in a separate heated barrel. The output of these plasticizing units is brought together by a system of manifolds which convey the several materials to the point of injection into the mold. According to well known principles of viscous flow, the first material to enter the mold remains substantially on the outside of the molded part, and material injected later remains substantially in the core of the part. The resulting "sandwich" construction yields a number of advantages, the principle advantages being: (1) to make a part with a chemically foamed core, gaining the light weight, low pressure, and flat surfaces of a foam part without the characteristic streaky exterior; (2) to use low cost recycled, "off-spec" or uncolored material where it is not visible; and (3) to make a part with different properties on the inside and outside, as for instance the presence or absence of reinforcing fibers or other property-changing additives.

These advantages are offset by the high cost and complexity of a machine requiring two or more independent reciprocating screws, together with the associated controls for simultaneous and/or sequential injection. As shown for example in FIG. 2, numerous attempts have therefore been made to reduce this complexity by having at least the injection function be performed by a single element, building a composite shot containing a plurality of melted materials within a single accumulation space. Examples include U.S. Pat. No. 4,978,493 to Kersemakers et al., U.S. Pat. No. 3,966,372 to Yasuike et al., and U.S. Pat. No. 5,443,378 to Jaroschek et al. In all of these examples of prior art, a secondary extrusion screw and barrel, or more than one, is caused to communicate with the primary barrel by means of some melt-carrying manifold structure through which the secondary portion of the shot is charged. Because of the multiple barrels and screw drives, machines of this type still have disadvantages involving the high initial cost of the required components and associated control capability.

The complexity of a multi-material machine is further reduced by this inventor's previous U.S. patent application Ser. No. 09/850,696, wherein two coaxial screw elements are used to plasticize two materials within the space of a single barrel. However, the cost and complexity of producing a screw with a sufficiently large central bore, and the associated issues of wear and steel strength, are potential limitations which could limit such a coaxial configuration to machines with large barrel diameters.

SUMMARY OF THE INVENTION

An object of the present invention is to provide a means whereby the sandwich or coinjection molding process can be performed within the space of a single heated barrel, and furthermore by means of a machine having a single reciprocating screw. This makes it possible to adapt a conventional single-material molding machine to perform the coinjection process with relatively minor and low-cost changes.

A further object of the present invention is to provide a coinjection machine that operates substantially the same as a conventional machine to eliminate the high skill level normally needed to operate the conventional machines described above.

A further object of the present invention is to provide a coinjection machine that operates with less energy and occupies less floor space than the conventional machines described above.

A further object of the present invention is to provide a means whereby a machine may be rapidly converted from conventional single-material format into a coinjection format, and back again, with no loss of original performance.

A further object of the present invention is to provide a coinjection conversion that does not reduce the injection volume, pressure, or speed of the original machine.

A further object of the present invention is to provide a coinjection technology that is practical and economic on a small machine.

To achieve these objects, an embodiment of this invention provides an injection unit or barrel (which can be externally heated) enclosing a screw having at least two flighted stages or plasticizing zones. The screw is movable rotationally and axially to respectively plasticize and inject a metered quantity of melted thermoplastic material(s). The screw has a hollow cylindrical bore or conduit extending from a point partway along the length of the screw to an opening in the downstream end of the screw which allows material from the primary screw flight or first plasticizing zone to be extruded into the accumulation space in front of the screw and to bypass a second plasticizing zone. This opening is preferably provided with a non-return valve to keep material from leaking back into the conduit.

Also, in addition to a primary feed throat for the first plasticizing zone, a secondary feed throat is provided immediately downstream of a non-flighted barrier zone to allow granular raw material to enter the flights of the downstream portion (second plasticizing zone) of the screw. Material thus plasticized by the second plasticizing zone is conveyed by the rotational action of the screw through a second non-return valve, whereupon it flows through an opening into the common accumulation space ahead of the screw.

One object of the present invention is to provide a device for melting polymeric material having: (1) a barrel having an upstream end and a downstream end; (2) a first material source; (3) a second material source; (4) a screw having at least a first plasticizing zone extending along a first length of the screw for plasticizing material from the first material source to convey a first melt toward the downstream end, and a second plasticizing zone extending along a second length of the screw for plasticizing material from the second material source to convey a second melt toward the downstream end, such that the first length and the second length are non-overlapping portions of the screw; and (5) separation means for separating the first melt from the second melt.

This device can also have: (1) at least one opening in the barrel for independently introducing the first material and the second material into the respective first plasticizing zone and the second plasticizing zone; (2) a conduit through which the first melt flows from the first plasticizing zone to an accumulation space in the barrel; and/or (3) one or more non-return valves for the melts before an accumulation space in the barrel.

This device can also provide that each of the first melt and the second melt enter an accumulation space in the barrel at one or more respective openings; each such opening formed at a different location in the accumulation space. Furthermore, the one or more of the respective openings can be formed proximate a downstream end of the accumulation space and another one or more of the respective openings can be is formed proximate an upstream end of the accumulation space. Also, a connection between one or more of the respective openings of one of the first melt and the second melt can be provided.

The device can also provide: (1) movement means for moving along a longitudinal axis of the barrel; and (2) that the screw have an elongated tip such that the movement means causes the elongated tip to be in close proximity with an exit orifice of the barrel so that material conveyed through the elongated tip displaces material in the accumulation space toward an upstream end of the accumulation space.

The device also provides for controlling the rate of plasticizing of one of the first zone and the second zone with respect to the other zone by having: (1) at least one controlled-rate pellet feeder; (2) a variable restriction in the conduit; (3) a backflow channel situated within at least one of the screw and barrel; (4) the first zone being formed with at least a first flight, and the second zone being formed with at least a second flight, such that at least one first flight and the at least one second flight are configured for greater sensitivity to the loss of flow due to back pressure than the other zone; and/or (5) the first zone being maintained at a first temperature, and the second zone being maintained at a second temperature, such that one of the first temperature and the second temperature are varied with respect to the other temperature.

Another object of the invention is to provide a molding machine having: (1) a first material source; (2) a second material source; (3) a screw having at least a first plasticizing zone extending along a first length of the screw for plasticizing material from the first material source to output a first melt into a first accumulation space, and a second plasticizing zone extending along a second length of the screw for plasticizing material from the second material source to output a second melt into a second accumulation space; and (4) a moveable barrier for separating the first accumulation space and the second accumulation space. The molding machine can also have moving means for moving the screw along a longitudinal axis such that the moveable barrier forces the first melt and the second melt from the respective accumulation spaces.

A further object of the present invention is to provide a method of producing molded objects with a composite structure comprising a core layer and a skin layer having the steps of: (a) rotating a screw having a longitudinal axis: (1) to melt first material in a first plasticizing zone extending along a first length of the screw and to cause melted first material to flow through a conduit and a first non-return valve into an accumulation space in front of the screw; and (2) to simultaneously melt second material in a second plasticizing zone extending along a second length of the screw to cause melted second material to flow through a second non-return valve into the accumulation space in front of the screw such that one of the first material and the second material form substantially toward the rear and outer periphery of the accumulation space thereby forming a composite shot, the composite shot forcing the screw back along the longitudinal axis; and (b) injecting the composite shot into a mold.

Another object of the present invention is to provide a method of producing molded objects with a composite structure comprising regions of dissimilar materials, having the steps of: (a) rotating a screw having a longitudinal axis: (1) to melt first material in a first plasticizing zone extending along a first length of the screw and to cause melted first material to flow through a conduit and a first non-return valve into a first accumulation space in front of a barrier thereby forcing the screw back along the longitudinal axis; and (2) to simultaneously melt second material in a second plasticizing zone extending along a second length of the screw to cause melted second material to flow through a second non-return valve into a second accumulation space behind the barrier; and (b) axially moving the screw to inject: (1) the melted first material in the first accumulation space through a first channel; and (2) the melted second material in the second accumulation space through a second channel as a composite shot into a mold. The step of axially moving the screw to inject may include: (1) simultaneously injecting the melted first material and the melted second material; or (2) sequentially injecting the melted first material and the melted second material

DETAILED DESCRIPTION OF THE INVENTION

Figure 1:
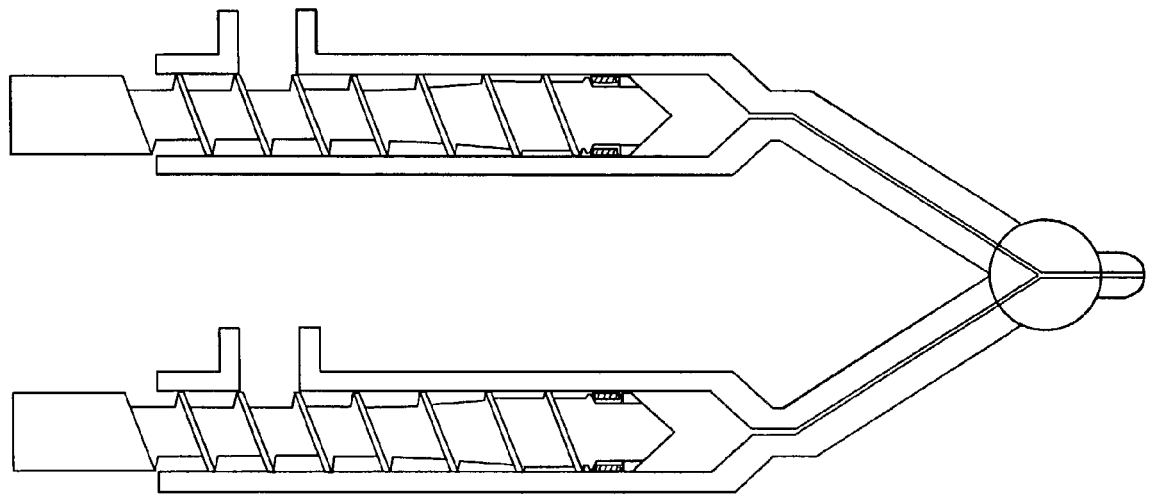
FIG. 1 illustrates the most common practice of prior art co-injection, with two injection barrels and a manifold to join the melt streams as they are being injected.
Figure 2:
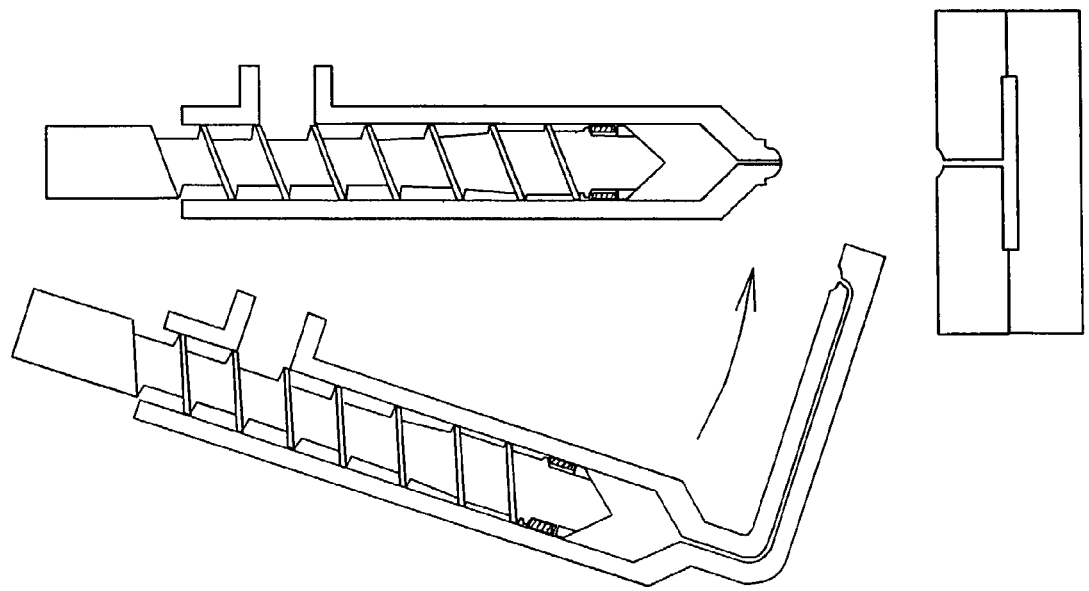
FIG. 2 illustrates one form of prior art co-injection with a single accumulator space, as taught by U.S. Pat. No. 5,443,378.

The present invention starts with components typical of a standard injection molding machine. These include a heated cylindrical pressure vessel, the barrel 10, provided with a cylindrical bore 12 in which plastic material is melted and accumulated. The barrel 10 is provided with an opening, the feed throat 14, through which raw material is introduced into the cylindrical bore 12. The end of the bore or nozzle 16 opposite to the feed throat 14 is provided with a substantially conical reduction in diameter terminating in the small-diameter channel outlet 18 communicating with a mold.

A standard injection molding machine is further provided with an injection platen 20 mounted on guide ways and moved in a linear direction by means of hydraulic cylinders 22. The platen 20 further comprises the mounting point for a rotational drive 23, typically a hydraulic or electric motor capable of high torque at low rotational speeds.

Figure 3:
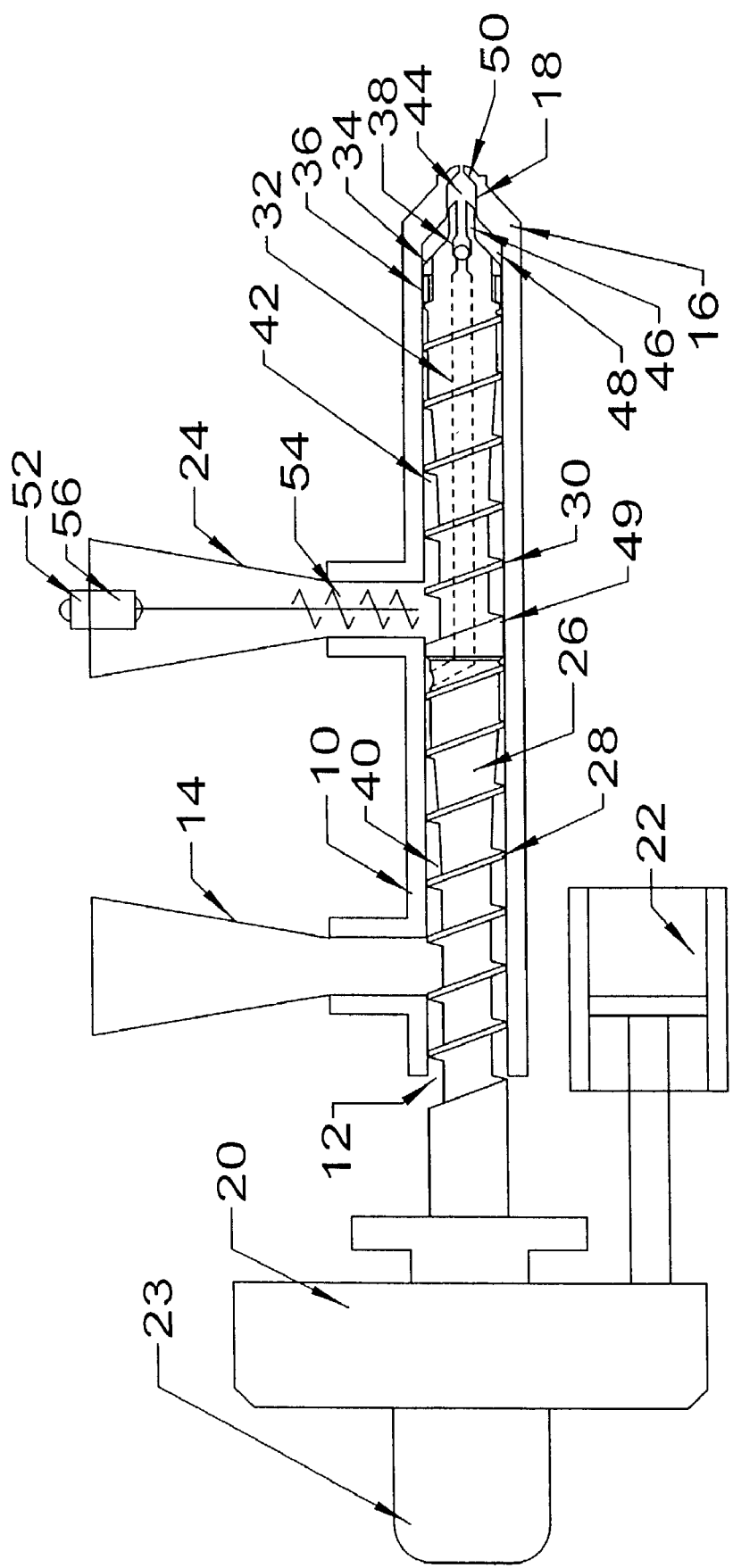
FIG. 3 illustrates an embodiment of the present invention in schematic form.

As shown in FIG. 3, one embodiment of the present invention departs from the form of a standard injection molding machine in that the barrel 10 is provided with a second feed throat 24. A screw 26 has at least two external threads or flights 28, 30 to convey material from the two feed throats 14, 24 forward inside the barrel 10 and convert it into a fluid form. Separate means, a bore or conduit 32 and an opening 34, are provided to allow melted material to exit the downstream ends of the flights 28, 30 and accumulate in front of the screw 26. Further means are provided to prevent the reverse from happening; to keep material so accumulated from reentering the threaded portions. The most common embodiments of this function is a ring type check valve 36 or a ball type check valve 38.

More specifically, the screw 26 is provided with a cylindrical bore or conduit 32 which conveys melt from the primary threaded portion or first plasticizing zone 40 past the secondary threaded portion or second plasticizing zone 42, through an opening 44 in the tip 46 of the screw 26 and into the common accumulation space 48. The opening 44 is provided with a non-return valve, for example a ball type check valve 38. As melt is thus accumulated, the volume of the common accumulation space 48 is allowed to increase by means of backward motion of the injection platen 20.

Simultaneously or sequentially, the secondary threaded portion or second plasticizing zone 42 conveys melt from the flight(s) 30 in its zone through an opening 34 between the screw 26 and the barrel 10 and into the common accumulation space 48 behind and to the periphery of the melt flowing out of the conduit 32. The opening 34 is provided with a non-return valve, for example a ring type check valve 36.

Between the plasticizing zones 40, 42 of the screw 26, a barrier 49 prevents the melt in the first plasticizing zone 40 from continuing along the barrel 10 to mix with the melt in the second plasticizing zone 42. Instead, the barrier 49 channels the melt in the first plasticizing zone 40 into the conduit 32.

In one embodiment of the present invention, the barrier 49 is a non-flighted section of the screw 26 having a diameter approximately equal to the interior barrel diameter. In this embodiment, the barrier 49 is placed immediately downstream of the inlet to the conduit 32.

Backward axial motion of the screw 26 is caused by the accumulation of melt proceeding from the opening 44 of the cylindrical conduit 26 and/or the opening 34 between the screw 26 and the barrel 10 downstream of the second plasticizing zone.

In this way layers of melted thermoplastic material are formed in the accumulation space 48. This accumulated melt is then injected into a closed mold by means of the hydraulic cylinders 22. Material closest to the outlet 18 of the accumulation space 48 will be the first to enter the mold, and will begin to cool against the mold surface. Material furthest from the outlet 18 will enter the mold later and will become the core of the object or part. In this manner parts containing a core of a different composition from the surface composition may be molded.

Furthermore, heater elements (not shown), typically electric, on the outside of the barrel 10 can raise the barrel temperature to the ideal conditions for melting the materials. In one embodiment, a different temperature can be maintained around each of the respective plasticizing zones 40, 42 which is especially useful for different properties of respective melt materials.

It has been determined experimentally that contamination of the outer surface of molded parts by traces of core material can be eliminated by use of an elongated tip 46 on the screw 26. At the beginning of an extrusion cycle, when the screw 26 is fully forward, the end of the elongated tip 46 is nearly in contact with the rear face 50 of the machine nozzle 16. Consequently, as skin material is extruded out of the elongated tip 46, any traces of core material remaining within the barrel 10 are forced back toward the rear of the accumulation space 48. Subsequent extrusion of core material into the upstream end of the accumulation space 48 will produce the desirable concave shape to the interface between the two materials. Such a concave interface is found to produce a more abrupt and defined transition between the materials as they are injected, advantageously maximizing the ratio of core to skin material.

In the practical application of this invention, it is frequently desirable to control the relative amounts of the two materials in the finished part. This is accomplished by controlling the rate that the two materials are plasticized in their respective threaded screw zones 40, 42, by one or more of the following mechanisms.

The melting rate of a screw can be reduced by the provision of a controlled-rate feeder 52, commonly known as a "starve-feeder" or "pellet-feeder", placed on one or both of the feed throats 14, 24. This device commonly employs an augur 54 driven by a variable-speed motor 56, to allow only a reduced amount of granular raw material to enter the screw flights of the plasticizing zones 40,42. As opposed to the more common practice of flooding the screw flights of the plasticizing zones 40, 42 with granular material, the controlled rate feeder 52 allows the screw 26 to operate with partially filled flights, and the output of the plasticizing zones 40, 42 is reduced.

Figure 5:
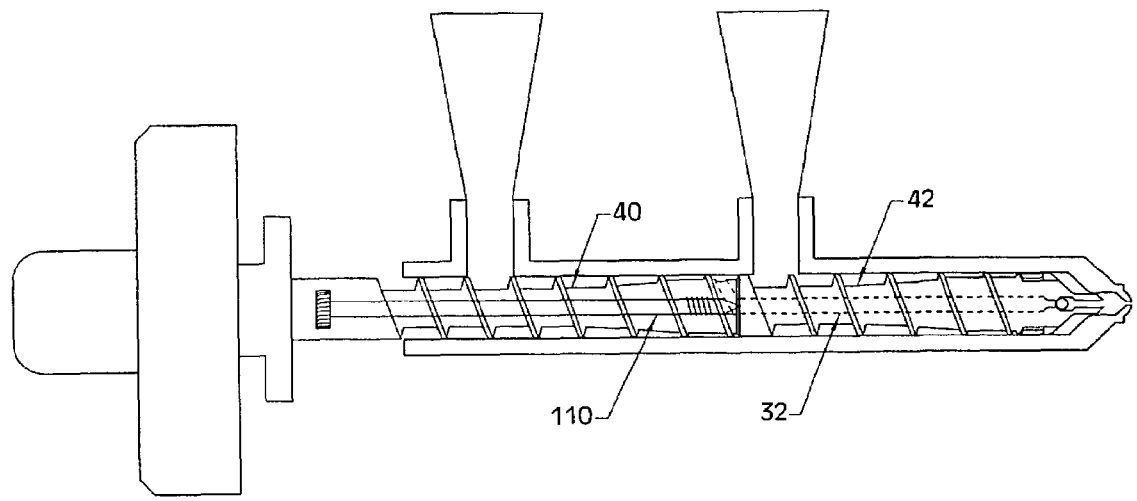
FIG. 5 illustrates an embodiment of the present invention with an adjustable mechanical restriction.

As shown, for example, in FIG. 5, a further mechanism that can be used is an adjustable mechanical restriction 110 in the outlet or conduit 32, of one or more of the plasticizing zones 40, 42. This adjustable mechanical restriction 110 can be a needle valve as illustrated in FIG. 5. One preferential position to place such a valve is within the cylindrical bore conduit 32.

Figure 6:
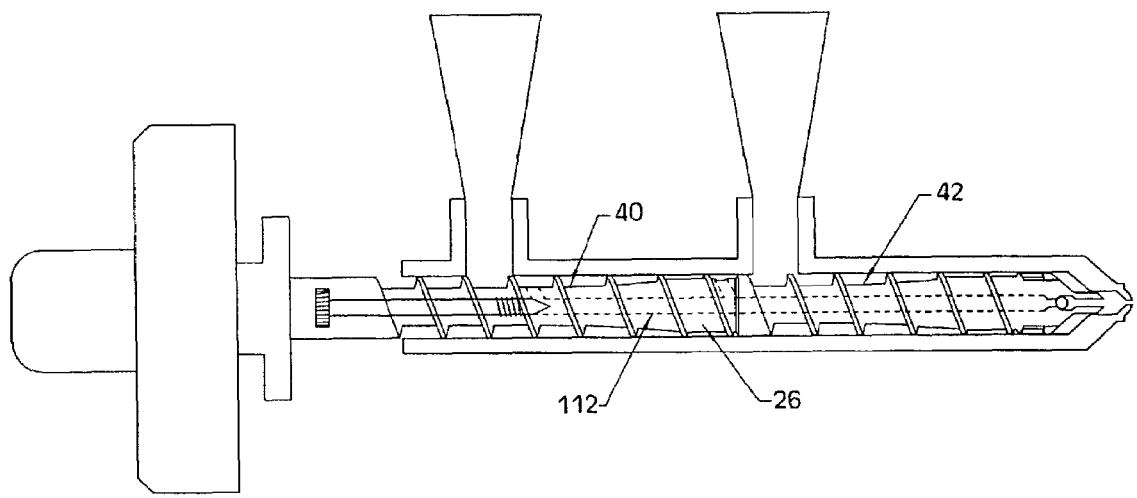
FIG. 6 illustrates an embodiment of the present invention with a back flow channel.

As shown, for example, in FIG. 6, a further mechanism that can be used to control flow rate is a back-flow channel 112, connecting a point downstream on the screw flight of plasticizing zone 40, 42 to a point upstream in the same plasticizing zone. Such a channel 112 may be bored into the screw 26 itself, or it may be formed in the barrel wall. The pressure differential between the ends of the channel 112 will cause material to leak back from the high-pressure downstream end and re-enter the screw flight of the plasticizing zone 40, 42 at the upstream end. The channel 112 may optionally be provided with an adjustable restriction as described above.

Figure 4:
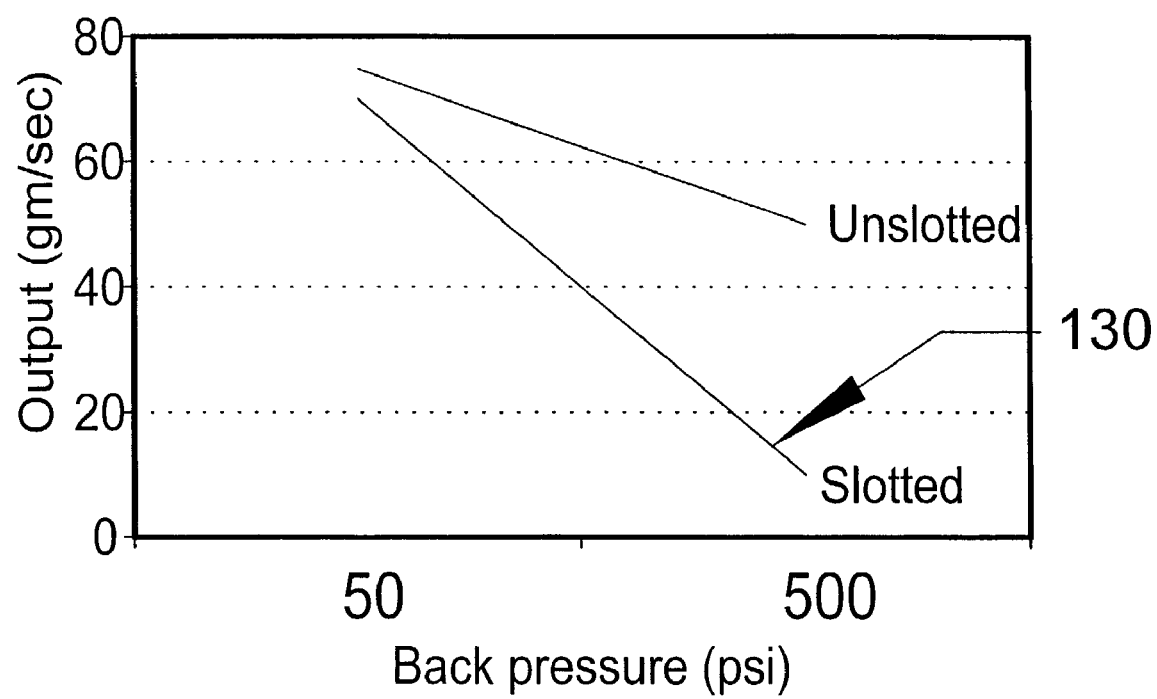
FIG. 4 graphs the relationship between back pressure and screw output for two flight designs.
Figure 7:
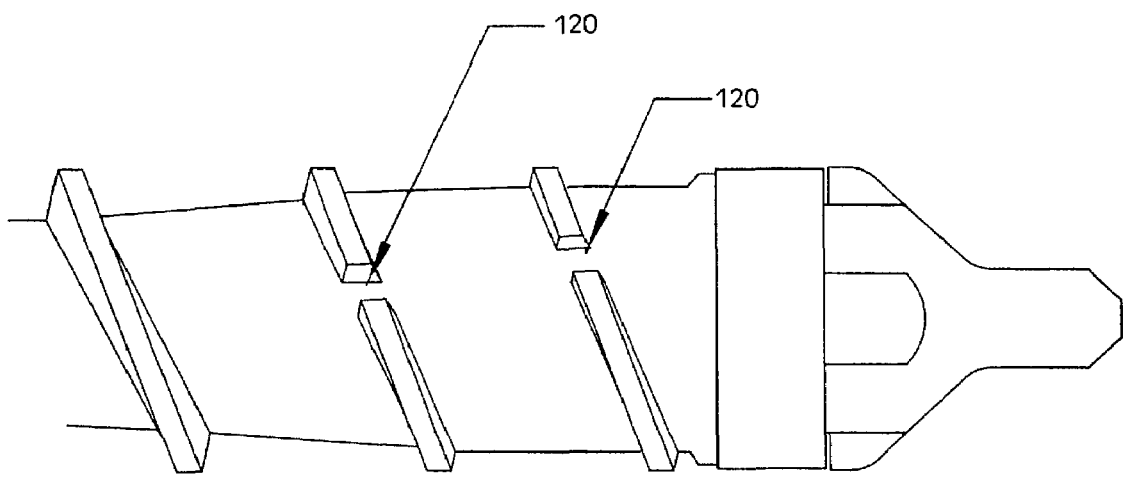
FIG. 7 illustrates a flight of a screw having gaps according to an embodiment of the present invention.

A still further mechanism to control the flow rate is to design the flight(s) of one of the plasticizing zones 40, 42 to be more sensitive than the other to reverse flow due to the pressure gradient along the flight(s). This may be done, as shown in FIG. 7 for instance, by providing gaps or slots 120 in the continuous flight(s), or by increasing the space between the flight(s) and the barrel wall for some or all of its length. In such a situation, as shown in FIG. 4, the output of the plasticizing section or zone so modified will decrease more rapidly under conditions of higher back pressure during screw rotation 130, and a difference in output ratio can be achieved by altering back pressure.

One means of ensuring a more stable output over a range of back pressures is the provision of feed-zone grooves parallel to the screw shank direction. Such grooves can be formed on the inside surface of the barrel 10 to provide a grip along the barrel in the parallel direction so that the plastic does not rotate with the screw 26. Such rotation can lead to unstable intermittent rotational slippages of the melt material. Pressure stability can also be enhanced by providing a longer metering section on one of the screw segments.

A further means of controlling relative output of the screw segments is to adjust their respective temperatures by means of controlling the surrounding barrel temperature. For most materials, a change of barrel temperature will affect the rate of plasticizing, primarily via changes in the melt's viscosity and adhesion to the barrel 10 and screw 26.

Particularly in the case of a retrofitted conventional machine, it is desirable to fit the two-stage screw 10 into the same barrel length as the original screw of the conventional machine, which typically has a length/diameter ratio (L/D) of 20:1. Since two full melting stages (plasticizing zones) must exist in the length formerly occupied by a single melting stage, more melting must be performed in less distance. However, due to the simultaneous melting in both stages, neither stage has to melt the full amount for the shot, so output per revolution on each individual stage may be reduced without a negative effect on recovery time.

Many techniques exist to achieve a good melt quality in a short screw. In particular, work has been done on vented two-stage 20:1 screws by such aftermarket screw companies as Spirex Corporation of, Youngstown, Ohio, Westland Corporation of Wichita, Kans., and Xaloy Corporation of Pulaski, Va. One technique used by these companies is to decrease the flight pitch of the screw, causing a longer total melt path in the same length of screw. A second technique is to decrease the flight depth. When combined with the former technique, the resulting shape of the melt channel is similar to that of a smaller full-length screw.

Another technique used to improve melt quality in a shorter screw, at the expense of output rate, is to add mixing elements. Numerous mixing geometries exist, all aimed at increasing distributive mixing by separating and recombining melt streams or increasing dispersive mixing by means of localized high-shear zones. A screw design that allows a high degree of back-flow, as described in the paragraphs above, will also promote increased shear and more thorough melting.

Figure 8:
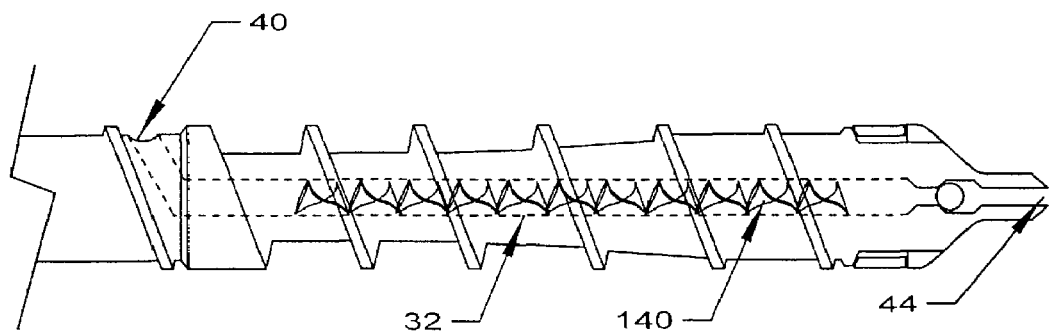
FIG. 8 illustrates static mixing elements for dividing and recombining material according to an embodiment of the present invention.
Figure 9:
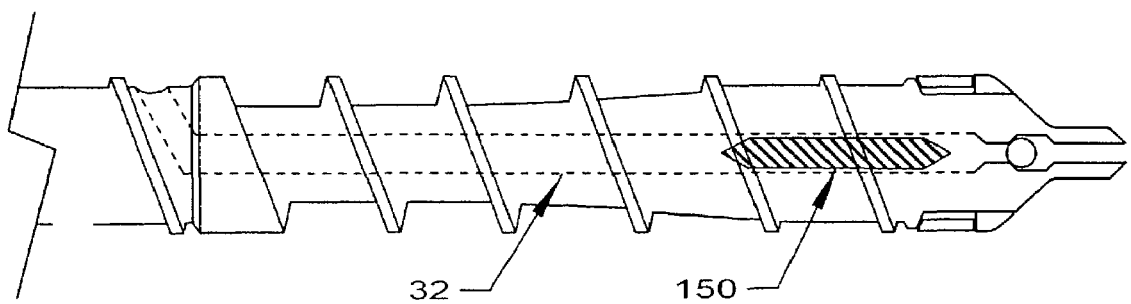
FIG. 9 illustrates a torpedo spreader according to one embodiment of the present invention.

In the case of the upstream stage, the bore or conduit 32 between this first plasticizing zone 40 and the opening 44 into the accumulation space 48 can be used for further melt conditioning. Specifically, this conduit 32 may be provided with static mixing elements 140 which divide and recombine the melt stream as it is forced through them, as shown, for example, in FIG. 8. Alternatively, "torpedo" spreaders 150 placed within that conduit 32 provide localized shear heating and dispersive mixing, as shown, for example, in FIG. 9. Additional heat for melting may also be conducted through the screw wall to further improve the homogeneous melt.

The present invention has been primarily described in terms of injection molding. However, since reciprocating screws are used in other applications, such as for example, injection blow molding and extrusion blow molding, the present invention is applicable to such applications as well.

The present invention has been described in terms of an embodiment including a reciprocating screw. It is also possible to employ the same invention in an embodiment where the screw is axially fixed, as in an extrusion press for instance.

In addition, the present invention has been described in terms of an embodiment including a hydraulic machine. It is equally applicable to machines whereby the injection function is performed by a ball screw, linear motor, or other non-hydraulic device in lieu of the hydraulic cylinder 22.

The present invention has also been described in terms of an embodiment wherein the primary (upstream) flighted section or first plasticizing zone 40 produces the skin material of the finished object and the downstream flighted section or second plasticizing zone 42 produces the core material. It is within the scope of the present invention that by redirecting where the respective melt streams enter the accumulation space, to reverse this configuration that is, to produce the skin material in the second plasticizing zone 42.

One embodiment of the present invention is illustrated with two flighted plasticizing zones 40, 42. However, it is possible to practice the present invention in an embodiment that employs more than two sections or zones. In such an embodiment, the conduit(s) connecting the upstream sections to the accumulation space may not be centered within the screw.

The present invention has been described in terms of an embodiment having a single common accumulation space 48 and a single nozzle 16. It is possible, by means of a movable barrier 160 within the accumulation space, to keep the respective materials separate during accumulation and even to inject them through separate nozzles into the mold. Once inside the mold, the melt streams may be brought together within the runner system or within the mold cavity itself, according to the mold design.

Figure 10:
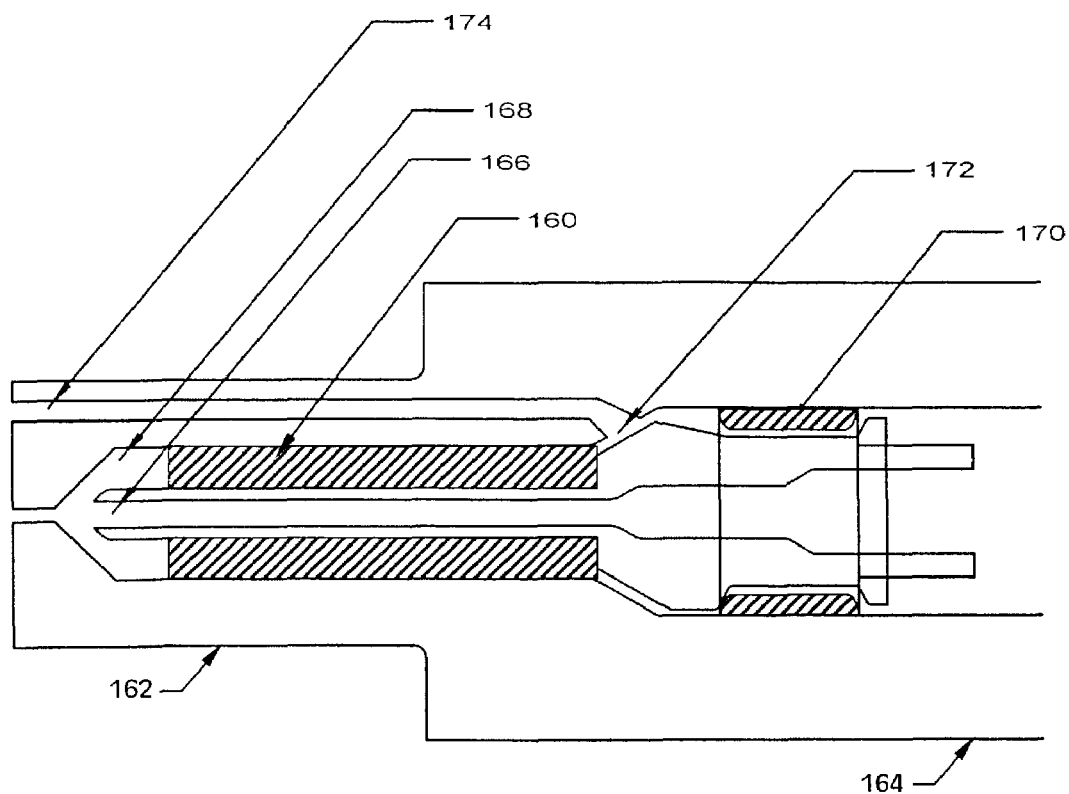
FIG. 10 illustrates a moveable barrier according to one embodiment of the present invention.

FIG. 10 is an embodiment of the present invention showing such a movable barrier 160. The moveable barrier 160 residing within the nozzle area 162 of the injection barrel 164 and being of a hollow cylindrical shape, allows material extruded through the screw tip 166 to be accumulated in forward space 168. Additional material extruded through check valve 170 accumulates in the separate, rearward space 172 until which time it is displaced through secondary opening 174 via forward motion of the screw assembly. The position of barrier 160 prior to injection is determined by the relative amounts of material extruded through the two respective outlets, the tip 166, and the secondary opening 174.

Figure 11:
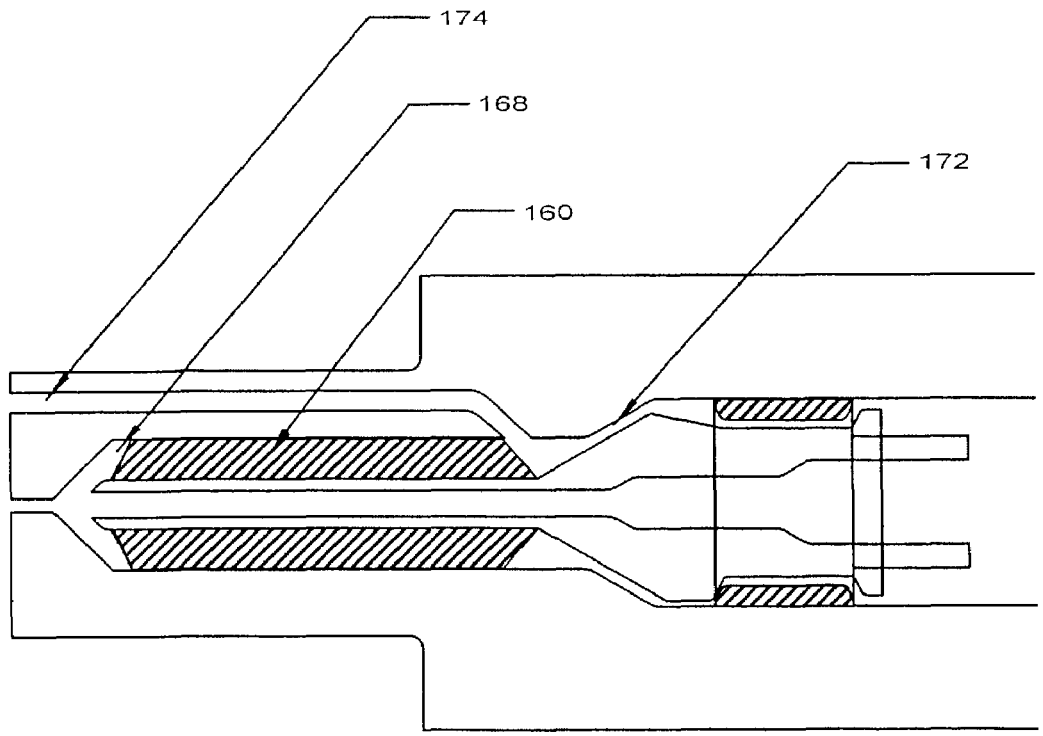
FIG. 11 illustrates another moveable barrier according to one embodiment of the present invention.

FIG. 11 shows a variation of the embodiment shown in FIG. 10. In this embodiment, the secondary opening 174 is blocked until the movable barrier 160 has reached its substantially furthest forward travel. This ensures that substantially all of the material accumulated in the forward space 168 has been expelled prior to the expulsion of material in the rearward space 172.

Figure 12:
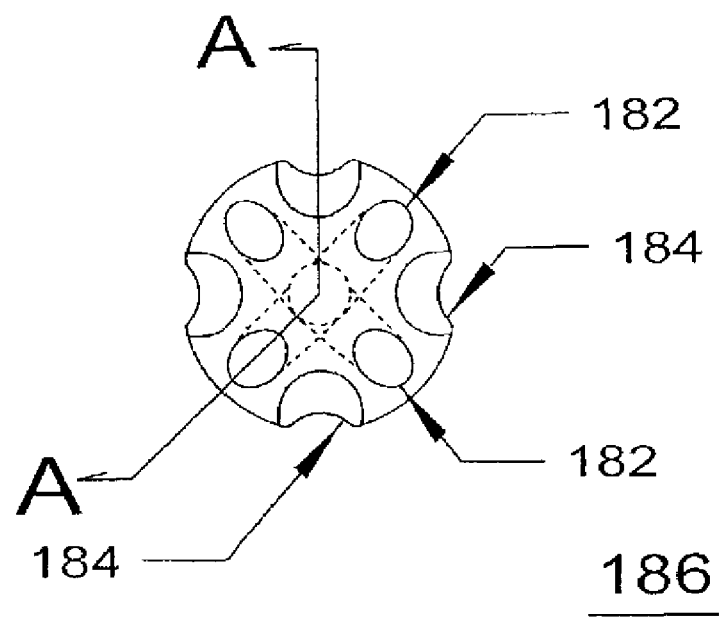
FIG. 12 illustrates interspersed openings arranged radially around the circumference of the screw tip according to one embodiment of the present invention.
Figure 13:
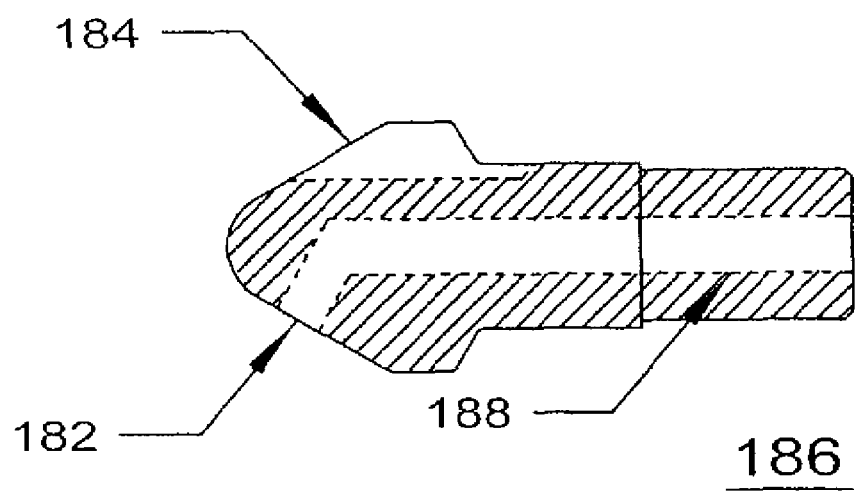
FIG. 13 illustrates a cross-sectional view of the screw tip illustrated in FIG. 12 according to one embodiment of the present invention.

FIG. 12 shows yet another embodiment of the present invention. It may be desirable to make parts having a random variegated appearance, such as for imitations of marble or tortoise shell. The output of two or more plasticizing zones can be made to flow into the accumulation space from a number of interspersed openings 182, 184 arranged, for example, radially around the circumference of the screw tip 186. One set of openings 182 can be branches from the conduit 188 while the other set 184 can be indentations in the edge of the screw tip. As the screw turns, the flows of the materials accumulate in a substantially random pattern.

The present invention has been described in terms of thermoplastic injection molding. It can also be applied in the practice of injection molding powdered metals, composite materials, thixotropic metal slurries, or reactive thermosetting polymers.

EXAMPLE 1

An injection molding machine having a 45 millimeter barrel diameter, produced by Ferromatik Milacron of Batavia, Ohio, was fitted with a barrel and screw in accordance with the present invention. A single starve feeder was mounted to the downstream feed throat. Using a variety of molds, multilayer parts having a weight of 12 grams up to 250 grams were produced. In these parts, the inner core layer was varied between 10% and 70% of the total part weight. Thermoplastic materials used successfully included polypropylene, polyethylene, acrylonitrile butadiene styrene, nylon, polyphenylene oxide, acetal, polyvinyl chloride, and polycarbonate.

EXAMPLE 2

On the machine in Example 1, a second starve feeder was mounted to the upstream feed throat. With the second feeder, parts having a core percentage as high as 95% by weight were produced, with the core material being polypropylene and the skin material being thermoplastic elastomer.

EXAMPLE 3

The machine in Example 1 was fitted with front end components as shown in FIG. 11. Using a mold with two independent runners feeding different points of a common cavity, parts were produced having regions composed throughout of two different materials, rather than of a sandwich structure.

While the present invention has been described in terms of specific embodiments, this invention encompasses all variations and modification, including expedients by those skilled in the art, which come within the spirit of the specification and the scope of the appended claims.

What is claimed is:

1. A device for melting polymeric material, comprising:
a barrel having an upstream end and a downstream end;
a first material source;
a second material source;
a screw having at least a first plasticizing zone extending along a first length of an exterior portion of the screw for plasticizing material from the first material source to convey a first melt toward the downstream end, and a second plasticizing zone extending along a second length of the exterior portion of the screw for plasticizing material from the second material source to convey a second melt toward the downstream end, such that the first length and the second length are non-overlapping portions of the screw;
separation means extending at least along the exterior portion of the screw between the first length and the second length for separating the first melt from the second melt; and
an accumulation space for receiving the first melt and the second melt, each melt separately conveyed from the respective plasticizing zone.

2. The device of claim 1 further comprising:
at least one opening in the barrel for independently introducing the first material and the second material into the respective first plasticizing zone and the second plasticizing zone.

3. The device of claim 1 wherein the separation means further comprises:
a conduit through which the first melt flows from the first plasticizing zone to the accumulation space in the barrel.

4. The device of claim 1 wherein:
each of the first melt and the second melt flows through at least one non-return valve into the accumulation space in the barrel.

5. The device of claim 1 wherein:
each of the first melt and the second melt enter the accumulation space in the barrel at one or more respective openings; each such opening formed at a different location in the accumulation space.

6. The device of claim 5 wherein:
one or more of the respective openings is formed proximate a downstream end of the accumulation space and another one or more of the respective openings is formed proximate an upstream end of the accumulation space.

7. The device of claim 5 further comprising:
a connection between one or more of the respective openings of one of the first melt and the second melt.

8. The device of claim 1 wherein the device further comprises:
movement means for moving along a longitudinal axis of the barrel; and
the screw further comprises an elongated tip;
such that the movement means causes the elongated tip to be in close proximity with an exit orifice of the barrel so that material conveyed through the elongated tip displaces material in the accumulation space toward an upstream end of the accumulation space.

9. The device of claim 1 further comprising:
at least one controlled-rate pellet feeder for controlling the rate of plasticizing of one of the first zone and the second zone with respect to the other zone.

10. The device of claim 3 further comprising:
a variable restriction in the conduit for controlling the rate of plasticizing of one of the first zone and the second zone with respect to the other zone.

11. The device of claim 1 further comprising:
a backflow channel situated within at least one of the screw and barrel for controlling the rate of plasticizing of one of the first zone and the second zone with respect to the other zone.

12. The device of claim 1 wherein:
the first zone is formed with at least a first flight on the exterior of the screw; and
the second zone is formed with at least a second flight on the exterior of the screw;
such that the at least one first flight and the at least one second flight are configured for greater sensitivity to the loss of flow due to back pressure than the other zone for controlling the rate of plasticizing of one of the first zone and the second zone with respect to the other zone.

13. The device of claim 1 wherein:

the first zone is maintained at a first temperature; and
the second zone is maintained at a second temperature; such that one of the first temperature and the second temperature are varied with respect to the other temperature for controlling the rate of plasticizing of one of the first zone and the second zone with respect to the other zone.

14. An injection molding machine comprising:
a first material source;
a second material source;
a screw having at least a first plasticizing zone extending along a first length of an exterior portion of the screw for plasticizing material from the first material source to output a first melt into a first accumulation space, and a second plasticizing zone extending along a second length of the exterior portion of the screw for plasticizing material from the second material source to output a second melt into a second accumulation space; and
a moveable barrier for separating the first accumulation space and the second accumulation space.

15. An injection molding machine as in claim 14 further comprising:

moving means for moving the screw along a longitudinal axis such that the moveable barrier forces the first melt and the second melt from the respective accumulation spaces.

16. A method of producing molded objects with a composite structure comprising a core layer and a skin layer comprising the following steps:

rotating a screw having a longitudinal axis: (1) to melt first material in a first plasticizing zone extending along a first length of an exterior portion of the screw and to cause melted first material to flow through a conduit and a first non-return valve into an accumulation space in front of the screw; and (2) to simultaneously melt second material in a second plasticizing zone extending along a second length of the exterior portion of the screw to cause melted second material to flow through a second non-return valve into the accumulation space in front of the screw such that one of the first material and the second material form substantially toward the rear and outer periphery of the accumulation space thereby forming a composite shot, the composite shot forcing the screw back along the longitudinal axis; and injecting the composite shot into a mold.

* * * * *